United States Patent
Al-Otoom et al.

(10) Patent No.: US 10,719,327 B1
(45) Date of Patent: Jul. 21, 2020

(54) BRANCH PREDICTION SYSTEM

(71) Applicant: Apple Inc., Cupertino, CA (US)

(72) Inventors: Muawya M. Al-Otoom, Pleasanton, CA (US); Ian D. Kountanis, Santa Clara, CA (US); Conrado Blasco, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1016 days.

(21) Appl. No.: 14/716,449

(22) Filed: May 19, 2015

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01)

(58) Field of Classification Search
CPC ............................ G06F 9/3806; G06F 9/30058
See application file for complete search history.

(56) References Cited

U.S. PATENT DOCUMENTS 5,651,135 A 7/1997 Hatakeyama

OTHER PUBLICATIONS

A. Seznec and P. Michaud, "A case for (partially)-tagged geometric history length predictors," Journal of Instruction Level Parallelism, Apr. 2006.*
André Seznec. The L-TAGE branch predictor. Journal of Instruction Level Parallelism, May 2007.*
Andre Seznec, "A 64 kbytes ISL-TAGE branch predictor," in Proceedings of the 3rd Championship Branch Prediction, Jun. 2011.*
T. Juan, S. Sanjeevan, J. Navarro, "Dynamic History-Length Fitting: A Third Level of Adaptivity for Branch Prediction", Proc. of the 25th Intl. Sym. on Computer Architecture, pp. 155-166, Jul. 1998.*
Ben Lee, Dynamic Branch Prediction, Apr. 20, 2014, https://web.archive.org/web/20140420013238/http://web.engr.oregonstate.edu/~benl/Projects/branch_pred.*
Andre Seznec, "A 64 Kbytes ISL-TAGE branch predictor," May 19, 2011, https://hal.inria.fr/hal-00639040, submitted on Nov. 8, 2011, 5 pages.
Andre Seznec, et al., "A case for (partially) TAgged GEometric history length branch prediction," IRISA/INRIA/HIPEAC, A1 Access Foundation and Morgan Kaufmann Publishers, 2006, 23 pages.
Andre Seznec, "The L-TAGE Branch Predictor," Journal of Instruction—Level Parallelism 9, 2007, pp. 1-13.

* cited by examiner

*Primary Examiner* — Aimee Li
*Assistant Examiner* — Kasim Alli
(74) *Attorney, Agent, or Firm* — Kowert, Hood, Munyon, Rankin & Goetzel, P.C.

(57) ABSTRACT

In some embodiments, a branch prediction unit includes a plurality of branch prediction circuits and selection logic. At least two of the branch prediction circuits are configured, based on an address of a branch instruction and different sets of history information, to provide a corresponding branch prediction for the branch instruction. At least one storage element of the at least two branch prediction circuits is set associative. The selection logic is configured to select a particular branch prediction output by one of the branch prediction circuits as a current branch prediction output of the branch prediction unit. In some instances, the branch prediction unit may be less likely to replace branch prediction information, as compared to a different branch prediction unit that does not include a set associative storage element. In some embodiments, this arrangement may lead to increased performance of the branch prediction unit.

18 Claims, 8 Drawing Sheets

BRANCH PREDICTION SYSTEM

BACKGROUND

Technical Field

This disclosure relates generally to a branch prediction system.

Description of the Related Art

One key factor affecting the performance of processors is the management of branch instructions (or more briefly, "branches"). A variety of branch predictors may be used to predict the direction (taken or not taken), the target address, etc. for branches, to allow the processor to fetch ahead of the branches. If the predictions are correct, subsequent instructions to be executed after each branch may already be preloaded into the processor's pipeline, which may enhance performance (e.g., execution time), as compared to fetching the instructions after executing each branch. Further, the subsequent instructions may be speculatively executed and thus may be ready to retire/commit results when the branch is resolved (if the prediction is correct), which may further enhance performance.

While successful branch predictions may increase performance, branch mispredictions may incur costs in both performance and power. Instructions that are subsequent to the branch in the speculative program order (sometimes referred to as younger instructions) may need to be flushed, any speculative state corresponding to the subsequent instructions may need to be discarded, and any speculative state corresponding to the most recent instructions that were not flushed may need to be restored or recreated, which may waste execution time of the processor. The power expended to recover from the misprediction and the power expended to incorrectly execute the flushed instructions may represent wasted power of the processor.

SUMMARY

In various embodiments, a branch prediction system is disclosed that includes one or more branch prediction units. At least one of the one or more branch prediction units may include a plurality of branch prediction circuits and selection logic. In some embodiments, at least one of the branch prediction circuits includes a storage element that is set associative (e.g., eight-way set associative). As a result, in some cases (e.g., when multiple branch instructions map to a same entry of the storage element), the branch prediction circuit may preserve additional branch prediction data, as compared to a storage element that is not set associative (e.g., direct mapped). In some embodiments, preserving the additional branch prediction data may result in additional correct branch predictions. In some embodiments, one way to reduce the odds that multiple branch instructions map to a single entry of a storage element is to increase a number of entries of the storage element. However, increasing the number of entries may undesirably increase the area of the storage element. In some embodiments, a set associative storage element may be smaller (e.g., more area efficient), as compared to a storage element that is not set associative having a similar likelihood of correctly predicting a branch result.

To illustrate, in some embodiments, a storage location of prediction information for a branch instruction may be determined using an addressing scheme (e.g., a hash of address information). In some embodiments, multiple branch instructions may correspond to a single address (e.g., a single hash value). In some embodiments, a set associative storage element may store prediction information such that when two or more instructions map to a single address, the corresponding prediction information may be written to different entries (e.g., each corresponding to the single address). The prediction information may be used during subsequent executions of the multiple branch instructions to predict a result (e.g., a direction and/or a target) of the subsequent executions. Alternatively, a non-set associative storage element (e.g., a direct mapped storage element) may store prediction information from a single branch instruction at each address. In some cases, when multiple branch instructions map to a single address, branch information for at least one of the multiple branch instructions may not be stored at the non-set associative storage element. The non-set associative storage element failing to store prediction information for a branch instruction may cause future execution of that branch instruction to be mispredicted.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used herein, the term "based on" describes one or more factors that affect a determination. This term does not foreclose additional factors that may affect the determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B. Additionally, where B includes multiple elements (e.g., multiple data values), A may be based on B as long as at least one of the elements of B affects the determination of A.

As used herein, the phrase "in response to" describes one or more factors that trigger an effect. This phrase does not foreclose additional factors that may affect or otherwise trigger the effect. That is, an effect may be solely in response to those factors, or may be in response to those factors as well as in response to other factors. Consider the phrase "perform A in response to B." While in this case, B is a factor that triggers the performance of A, such a phrase does not foreclose the performance of A from also being in response to C. In other instances, A may be performed solely in response to B.

As used herein, the terms "first," "second," etc. are used as labels for nouns that they precede, and do not imply any type of ordering (e.g., spatial, temporal, logical, etc.). For example, in a processor having eight processing elements or cores, the terms "first processing element" and "second processing element" can be used to refer to any two of the eight processing elements.

DETAILED DESCRIPTION

As described above, a branch prediction system may predict an outcome (e.g., a direction or a target address) of a branch instruction based on stored branch prediction information. However, in some cases, a direct mapped storage element of the branch prediction unit may map multiple sets of branch prediction information of multiple branch instructions to a single storage location. Mapping multiple sets of branch prediction information to a single storage location may result in the direct mapped storage element failing to store branch prediction information of at least some branch instructions, which may result in misprediction of future executions of such instructions. As will be discussed below, in some embodiments, a branch prediction system including at least some set associative entries may provide additional correct branch predictions for a program which includes branch instructions, as compared to a branch prediction system that includes no set associative entries. Some experimental results have shown that, in some cases, a branch prediction system including at least some set associative entries has a lower branch misprediction rate, as compared to branch prediction systems that include no set associative entries but that include additional branch prediction tables or that include larger branch prediction tables.

As described herein, storage elements of branch predictors may have different associativity types. As used herein, an "associativity type" refers to a number of entries of a storage element mapped to by a single address. As used herein, a "set associative" associativity type refers to a storage element where at least two entries are mapped to by a particular address. For example, an eight-way set associative associativity type describes a storage element in which each received address maps to eight entries of the storage element. As used herein, a "direct mapped" associativity type refers to a storage element where exactly one entry is mapped to by a particular address. For example, a direct mapped associativity type describes a storage element in which each received address maps to an individual entry of the storage element. A storage element may have a single associativity type or multiple associativity types (e.g., different portions of the storage element have different associativity types). Direct mapped and set associative refer to different associativity types. Similarly, different set associativities (e.g., two-way set associative vs. four-way set associative) refer to different associativity types. A set associative associativity type has a higher associativity than a direct mapped associativity type. Additionally, a set associative associativity type having more ways (e.g., four-way set associative) has a higher associativity than a set associative associativity type having fewer ways (e.g., two-way set associative).

Figure 1:
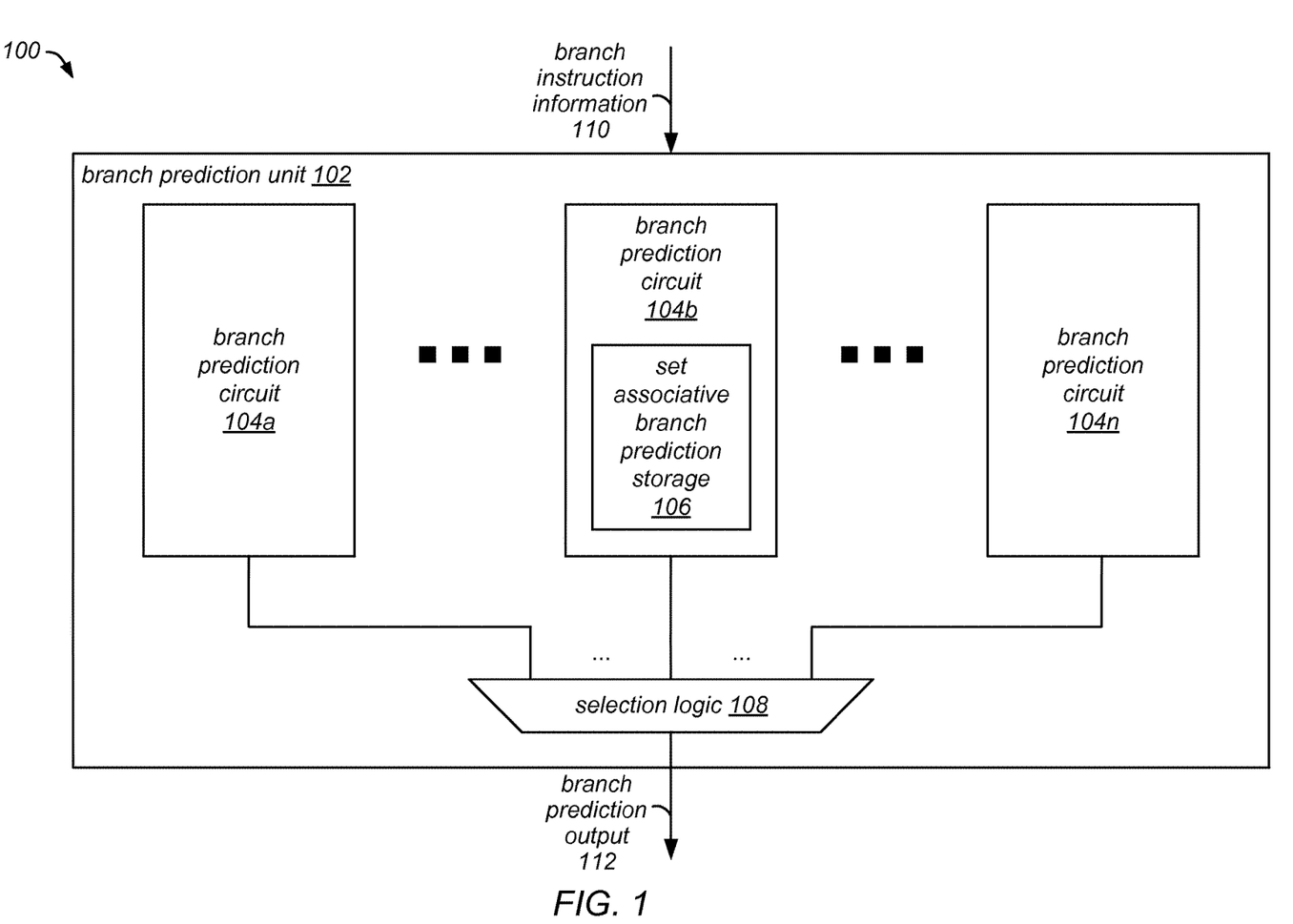
FIG. 1 is a block diagram illustrating one embodiment of an exemplary branch prediction system that includes an exemplary branch prediction unit.

This disclosure initially describes, with reference to FIG. 1, an embodiment of an exemplary branch prediction system that includes an exemplary branch prediction unit. Embodiments of one or more exemplary branch prediction units are further described with reference to FIGS. 2 and 3. The techniques and structures described herein, however, are in no way limited to the one or more branch prediction units shown in FIGS. 1-3; rather, this context is provided only as one or more possible implementations. An embodiment of an exemplary branch prediction circuit is then described with reference to FIG. 4. An embodiment of a branch prediction unit is then described with reference to FIG. 5. Embodiments of operation of one or more branch prediction units are described with reference to FIGS. 6 and 7. Finally, an exemplary computing system that includes a branch prediction system is described with reference to FIG. 8.

Turning now to FIG. 1, a block diagram of one embodiment of an exemplary branch prediction system 100 is shown. In the illustrated embodiment, the branch prediction system 100 includes a branch prediction unit 102. In the illustrated embodiment, the branch prediction unit 102 includes a plurality of branch prediction circuits 104*a-n* and selection logic 108. In the illustrated embodiment, the branch prediction circuit 104*b* includes a set associative branch prediction storage 106. Although, in the illustrated embodiment, only one branch prediction unit (the branch prediction unit 102) is shown, in other embodiments, the branch prediction system 100 includes more than one branch prediction unit. Although, in the illustrated embodiment, only the branch prediction circuit 104*b* includes a set associative branch prediction storage (the set associative branch prediction storage 106), in some embodiments, the branch prediction circuit 104*a*, the branch prediction circuit 104*n*, or both may include a respective branch prediction storage having a same associativity type as the set associative branch prediction storage 106 or a different associativity type from the set associative branch prediction storage 106.

The branch prediction unit 102 may provide a prediction (e.g., including a direction, a target address, etc.) regarding a branch instruction. For example, in response to branch instruction information 110, the branch prediction unit 102 may be configured to provide a branch prediction output 112. In some embodiments, the branch instruction information 110 may include address information of the branch instruction (e.g., corresponding to a memory address that includes the branch instruction), history information of the branch instruction (e.g., corresponding to previous executions of the branch instruction, corresponding to previous executions of other branch instructions, or both), or both. In some embodiments, at least a portion of the branch instruction information 110 is provided to the plurality of branch prediction circuits 104a-n. Some portions of the branch instruction information 110 (e.g., portions of the history information) may be provided to some of the plurality of branch prediction circuits 104a-n but not to others of the plurality of branch prediction circuits 104a-n. In some embodiments, in response to the branch instruction information 110, the plurality of branch prediction circuits 104a-n are configured to generate respective branch prediction. In some embodiments, the branch prediction circuit 104a is a base predictor configured to generate a base branch prediction (e.g., predicting a branch is never taken) without knowledge of previous executions of branch instructions. In various embodiments, the branch prediction circuit 104a includes a bimodal table or another form of branch prediction storage. If a particular branch prediction circuit includes a branch prediction storage (e.g., the set associative branch prediction storage 106), the respective branch prediction may be based on data stored at the branch prediction storage. In various embodiments, the respective branch predictions may differ. Additionally, in some embodiments, fewer than all of the respective branch predictions may correspond to the branch instruction indicated by the branch instruction information. Accordingly, the selection logic 108 may be configured to select a particular branch prediction (e.g., a prediction most likely to be correct). The particular branch prediction may be provided as the branch prediction output 112.

As discussed above, the set associative branch prediction storage 106 may be configured to generate a branch prediction in response to at least a portion of the branch instruction information 110. For example, the set associative branch prediction storage 106 may be configured to receive the branch instruction information 110 and may be configured to access at least two entries based on the branch instruction information 110. The set associative branch prediction storage 106 may generate the branch prediction based on data stored in at least one of the at least two entries. In some embodiments, the branch prediction may be further based on at least a portion of the branch instruction information 110 (e.g., based on a combination of data stored in an entry and history information of the branch instruction information). In some embodiments, in response to an indication of a branch misprediction, the set associative branch prediction storage 106 may be further configured to store information regarding the branch instruction. The information regarding the branch instruction may be stored in a particular entry of the set associative branch prediction storage 106. In some embodiments, the particular entry is selected based on an address value generated for the branch instruction (e.g., based on a hash of at least a portion of the address information of the branch instruction). A prediction for a new instance of a branch instruction based on data stored at the particular entry may be more accurate, as compared to a prediction from an entry that (previously) generated the branch misprediction.

In some embodiments, the set associative branch prediction storage 106 may be configured to store information regarding multiple branch instructions which each map to a single address value of the set associative branch prediction storage 106. The stored information may increase accuracy of branch prediction for the multiple branch instructions. Accordingly, storing the information regarding the multiple branch instructions may cause the branch prediction system 100 to more accurately predict results of the multiple branch instructions, as compared to a branch prediction system that does not include a set associative branch prediction storage.

Figure 2:
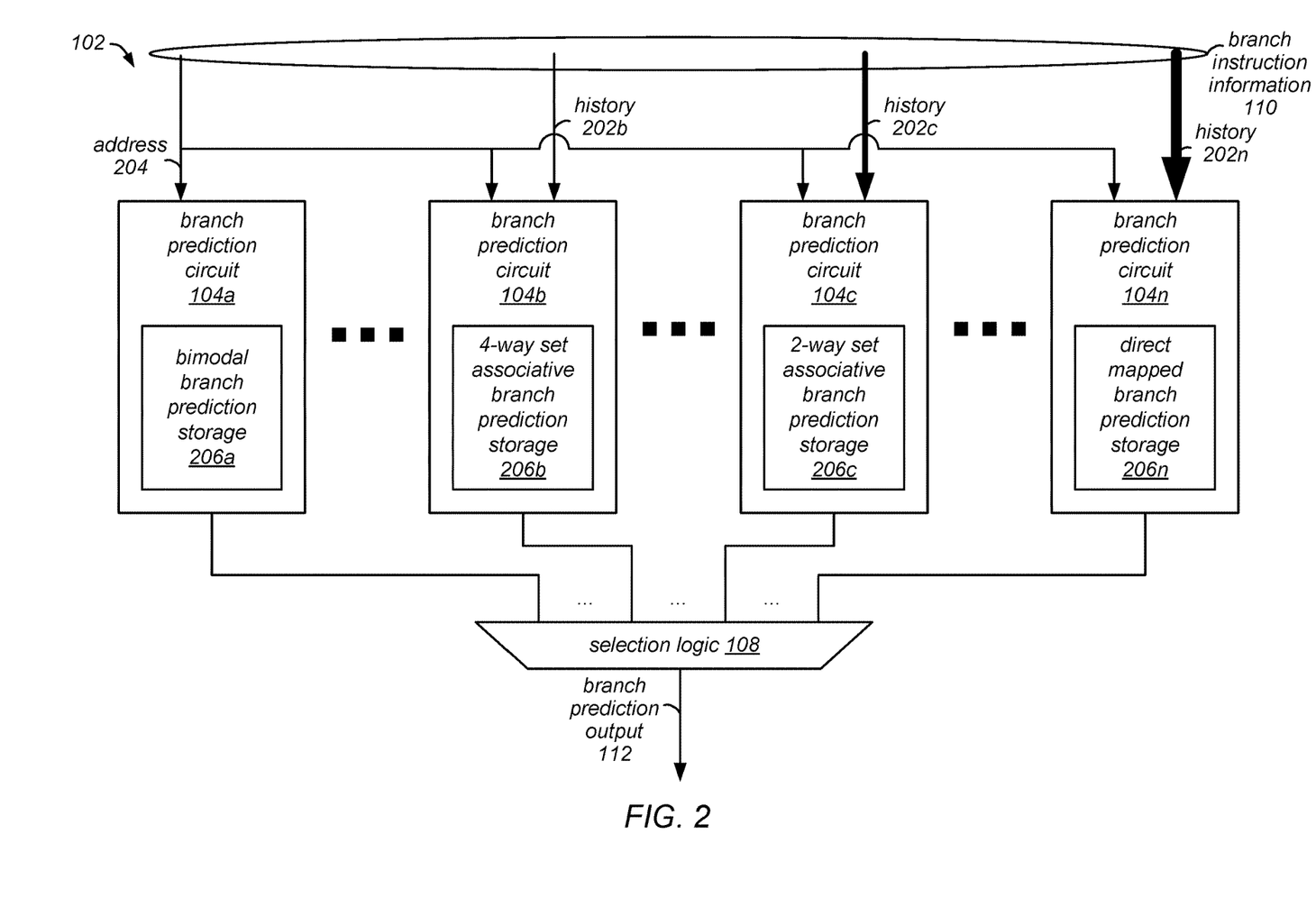
FIG. 2 is a block diagram illustrating one embodiment of an exemplary branch prediction unit.

Turning now to FIG. 2, a block diagram of an exemplary embodiment of the branch prediction unit 102 of FIG. 1 is shown. In the illustrated embodiment, the branch prediction unit 102 includes the plurality of branch prediction circuits 104a-n and the selection logic 108 of FIG. 1. In the illustrated embodiment, the branch prediction circuit 104a includes a bimodal branch prediction storage 206a. In the illustrated embodiment, the branch prediction circuit 104b includes a 4-way set associative branch prediction storage 206b which corresponds to the set associative branch prediction storage 106 of FIG. 1. In the illustrated embodiment, the branch prediction circuit 104c includes a 2-way set associative branch prediction storage 206c. In the illustrated embodiment, the branch prediction circuit 104n includes a direct mapped branch prediction storage 206n. In various embodiments, the 4-way set associative branch prediction storage 206b, the 2-way set associative branch prediction storage 206c, the direct mapped branch prediction storage 206n are the same size. In some embodiments, the 4-way set associative branch prediction storage 206b is larger than (has more entries than) the 2-way set associative branch prediction storage 206c. Similarly, in some embodiments, the 2-way set associative branch prediction storage 206c is larger than the direct mapped branch prediction storage 206n.

As discussed above, the plurality of branch prediction circuits 104a-n may be configured to generate branch predictions based on the branch instruction information 110. In the illustrated embodiment, the branch instruction information 110 corresponds to (e.g., includes) a history information 202b-n of the branch instruction and address information 204 of the branch instruction. In some embodiments, the branch prediction circuits 104a-n receive different amounts of (e.g., different sets of) the history information 202b-n. For example, in the illustrated embodiment, the branch prediction circuit 104b receives less history information than the branch prediction circuit 104c. In some embodiments, the history information 202c includes (e.g., is a superset of) the history information 202b. In other embodiments, the history information 202b includes at least some information not included in the history information 202c. In some embodiments, the branch prediction circuit 104b and the branch prediction circuit 104c receive the same amount of history information (e.g., because additional history information is unavailable). In the illustrated embodiment, the plurality of branch prediction circuits 104a-n receive the address information 204. In other embodiments, at least some of the branch prediction circuits 104a-n may receive a portion of the address information 204 or none of the address information 204.

In the illustrated embodiment, the plurality of branch prediction circuits 104a-n include branch prediction storages 206a-n having different associativity types (e.g., 4-way set associative, 2-way set associative, and direct map). The branch prediction storages 206a-n may use the address information 204 to identify at least one respective entry. The bimodal branch prediction storage 206a may be configured to generate a prediction based on stored information identified based on the address information 204. The branch prediction storages 206b-n may combine stored information from the at least one respective entry with respective history information to generate a respective prediction. In some embodiments, larger amounts (e.g., larger sets) of history information may be used to more accurately predict a result of a branch instruction. However, a prediction based on a larger amount of history information may take longer or may consume more power than a prediction based on a smaller amount of history information. Accordingly, in some embodiments, branch instruction information is only provided to the 2-way set associative branch prediction storage 206c after the branch prediction circuit 104b has mispredicted a result of the branch instruction. Therefore, in some embodiments, the branch prediction circuit 104b receives more storage requests than the branch prediction circuit 104c. In the illustrated embodiment, the branch prediction unit 102 is arranged such that the branch prediction circuit 104b includes a storage element having a higher associativity, as compared to the branch prediction circuit 104c. Accordingly, in the illustrated embodiment, the respective associativity types of the storage elements of the branch prediction circuits 104b-n may be associated with (e.g., inversely related to) an amount of history information the respective branch prediction circuits 104b-n receive. Further, the respective associativity types of the storage elements of the branch prediction circuits 104b-n may be arranged such that storage elements which receive more storage requests have a higher associativity than storage elements which receive fewer storage requests.

In some embodiments, as described above, storage element having a higher associativity is less likely to be unable to store respective information associated with at least one of multiple storage requests that each map to a single address value, as compared to a storage element having a lower associativity. Accordingly, a branch prediction circuit including a storage element having a higher associativity may be less likely to mispredict a result of a branch instruction. As described further with reference to FIG. 3, in some embodiments, a branch prediction circuit may be slower (e.g., because predictions are generated from entries serially), consume additional power (e.g., because more predictions are generated), consume additional area (e.g., because predictions are generated from entries in parallel), or any combination thereof, as compared to a less associative branch prediction circuit. In the illustrated embodiment, because some of the storage elements of the branch prediction circuits 104b-n are associative, the branch prediction unit 102 may be less likely to mispredict a result of most branch instructions, as compared to a branch prediction unit that only includes direct mapped branch prediction storage. In the illustrated embodiment, because some of the storage elements of the branch prediction circuits 104b-n are less associative than the 4-way set associative branch prediction storage, the branch prediction unit 102 may be faster, consume less power, consume less area, or any combination thereof, as compared to a branch prediction unit that only includes 4-way set associative branch prediction storage.

Figure 3:
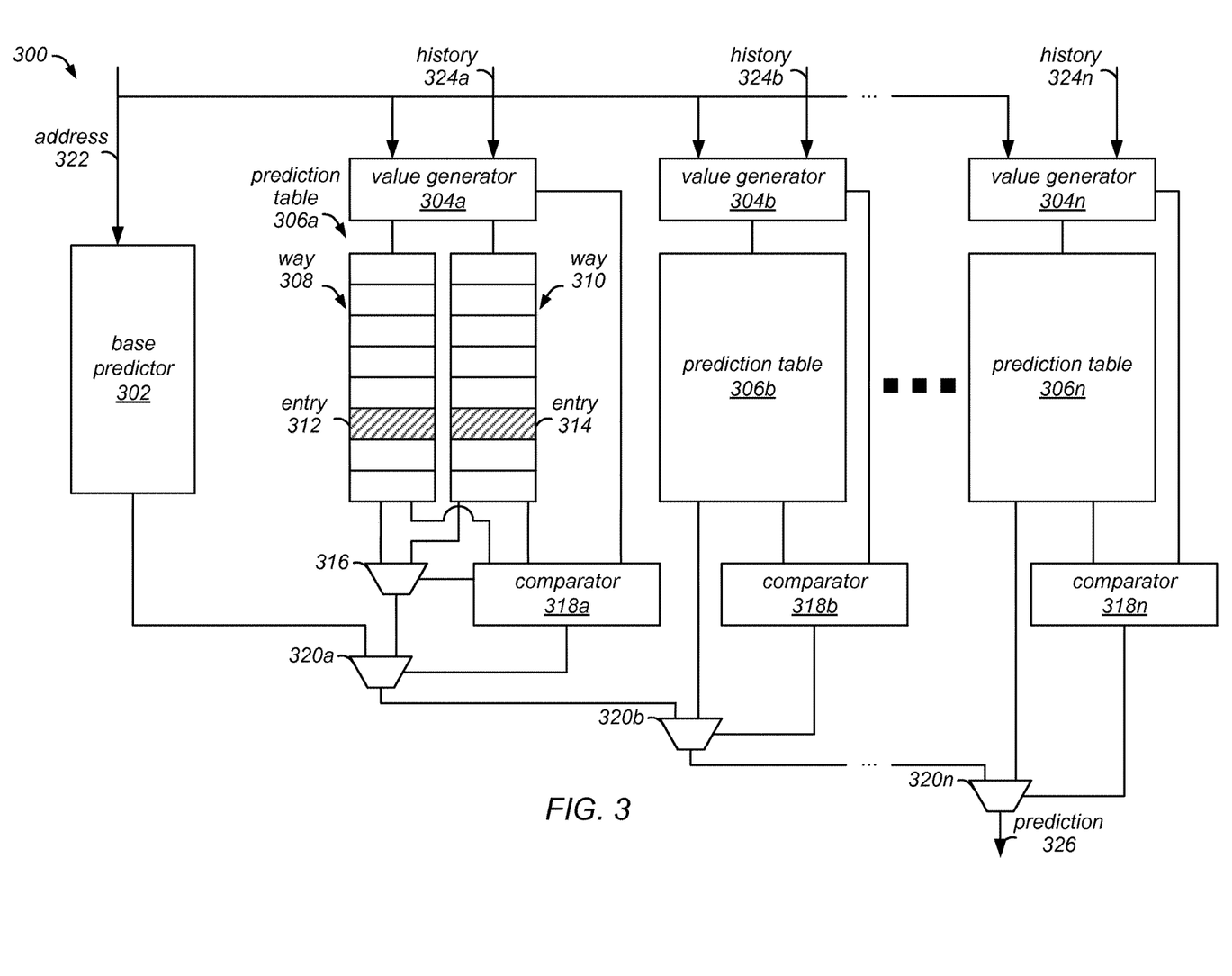
FIG. 3 is a block diagram illustrating one embodiment of an exemplary branch prediction unit.

Turning now to FIG. 3, a block diagram of one embodiment of an exemplary branch prediction unit 300 is shown. In some embodiments, the branch prediction unit 300 corresponds to the branch prediction unit 102 described above with reference to FIG. 1. In the illustrated embodiment, the branch prediction unit 300 includes a base predictor 302, a plurality of value generators 304a-n, a plurality of prediction tables 306a-n, a selection device 316, a plurality of comparators 318a-n, and a plurality of selection circuits 320a-n. In the illustrated embodiment, the prediction table 306a includes a first way 308 and a second way 310. In the illustrated embodiment, the first way 308 includes a first entry 312 and the second way 310 includes a second entry 314. In some embodiments, the branch prediction circuit 104b of FIG. 1 includes the value generator 304a, the prediction table 306a, the selection device 316, and the comparator 318a. In some embodiments, the branch prediction circuit 104n of FIG. 1 includes the value generator 304n, the prediction table 306n, and the comparator 318n. In some embodiments, the selection logic 108 of FIG. 1 includes the plurality of comparators 318a-n.

The base predictor 302 may be configured to generate a base prediction for a branch instruction. In some embodiments, the base predictor 302 may be configured to generate the base prediction without history information (e.g., on a first execution of a branch instruction). In some embodiments, the base predictor 302 may include a tagless bimodal table (e.g., a table configured to store a counter that indicates a frequency of the branch instruction being taken) indexed based on at least a portion of address information 322 of the branch instruction.

The plurality of value generators 304a-n may be configured to generate, based on at least a portion of the address information 322, at least a portion of respective history information 324a-n, or both, an index value that identifies one or more respective entries of the respective prediction tables 306a-n that may correspond to the branch instruction. In some embodiments, the index value is a hash value determined based on a portion (e.g., the most significant N bits) of the address information 322 and/or a portion of the respective history information 324a-n. For example, the value generator 304a may generate, based on a portion of the address information 322 and a portion of the history information 324a, an index value that identifies the entries 312 and 314 (e.g., one entry from each of the ways 308 and 310). In some embodiments, the plurality of value generators 304a-n are further configured to provide at least a portion of the address information 322, at least a portion of the respective history information 324a-n, or both, to the comparators 318a-n. In some embodiments, the plurality of value generators 304a-n are further configured to provide at least a portion of the respective history information 324a-n to respective computation circuits (not shown).

The plurality of prediction tables 306a-n may be configured to provide corresponding information from identified entries in response to an index value. As further described with reference to FIGS. 4 and 6, in some embodiments, the corresponding information may include prediction information and tag information. In some embodiments, the prediction information includes a respective prediction. In various embodiments, the prediction information is used to generate a respective prediction (e.g., by the plurality of prediction tables 306a-n, or by one or more other components of the branch prediction unit 300). As further described with reference to FIG. 7, the plurality of prediction tables 306a-n may be further configured to receive branch prediction information and to store the branch history information at an entry in response to an indication of a branch misprediction.

In some embodiments, the plurality of comparators 318a-n may be configured to determine, based on a portion of the address information 322 (e.g., a least significant M bits), based on tag information from the respective tables of the plurality of prediction tables 306a-n, based on respective history information 324a-n, or any combination thereof whether the respective one or more predictions correspond to the branch instruction. For example, the comparator 318a may be configured to compare a permutation or combination of the address information 322 and the respective history information 324a (e.g., a result of a shift folding-based hash function based on at least a portion of the address information 322 and at least a portion of the history information 324a) from the value generator 304a to the tag information from the entries 312 and 314. In some embodiments, in response to the tag information matching the output of the value generator 304a, the comparator 318a may indicate (e.g., to the selection device 316, to the respective selection circuit 320a, or both) that an entry corresponds to the branch instruction. In some embodiments, in response to the tag information failing to match the output of the value generator 304a, the comparator 318a may indicate that the entries 312 and 314 do not correspond to the branch instruction. In some embodiments, the plurality of comparators 318a-n may compare the tag information to the output of the value generator 304a in parallel. In other embodiments, the plurality of comparators 318a-n may compare the tag information to the output of the value generator 304a serially. In some embodiments, a comparator configured to compare the tag information to the output of the value generator 304a in parallel may be performed more quickly, as compared to a comparator configured to compare the tag information to the output of the value generator 304a serially. In some embodiments, a comparator configured to compare the tag information to the output of the value generator 304a serially may include less circuitry, as compared to a comparator configured to compare the tag information to the output of the value generator 304a in parallel, and thus, may consume less area, less power, or both. In some embodiments, another device may be used to identify whether the tag information corresponds to the branch instruction.

In some embodiments, the selection device 316 may be configured, based on an indication from the comparator 318a, to select between branch predictions corresponding to the identified entries of the prediction table 306a. Similarly, in some embodiments, the plurality of selection circuits 320a-n may be configured, based on indications from respective comparators of the plurality of comparators 318a-n, to select a particular branch prediction as a current branch prediction output 326 of the branch prediction unit 300. Although the selection device 316 and the plurality of selection circuits 320a-n are depicted as multiplexers, in some embodiments, other selection circuitry may be used.

In some embodiments, information stored at a respective entry of at least one of the plurality of prediction tables 306a-n includes the current branch prediction output 326. In some embodiments, the current branch prediction output 326 is generated by at least one of a plurality of respective computation circuits at least partially included in or connected to the plurality of value generators 304a-n, the plurality of prediction tables 306a-n, the plurality of selection circuits 320a-n, or any combination thereof. In some embodiments, the current branch prediction output 326 is generated based on information stored at an identified entry of at least one prediction table and based on corresponding history information. For example, in some embodiments, the history information 324a includes a geometric global branch history and the second entry 314 includes local history of the branch instruction. A respective computation circuit may provide to the selection circuit 320a a branch prediction based on the history information 324a and the local history stored at the second entry 314. The branch prediction may be selected as the current branch prediction output 326.

In some embodiments, the branch prediction unit 300 may be configured to generate the current branch prediction output 326 without the history information 324a-n (e.g., using information stored at the base predictor 302 and the plurality of prediction tables 306a). In some embodiments, respective entries of the prediction table 306n may store more information than respective entries of the prediction table 306b. In some embodiments, the history information 324a-n corresponds to a global history (e.g., global histories of varying geometric length) and information stored in the entries of the plurality of prediction tables 306a-n correspond to local history of branch instructions.

In some embodiments, the prediction table 306a may be configured to store information regarding multiple branch instructions which each map to a single index value at the value generator 304a. For example, the entries 312 and 314 may correspond to a single index value, and the prediction table 306a may store information regarding a first branch instruction that maps to the single index value at the first entry 312 and information regarding a second branch instruction that maps to the single index value at the second entry 314. The stored information may increase accuracy of branch prediction for the multiple branch instructions. Accordingly, storing the information regarding the multiple branch instructions may cause the branch prediction unit 300 to more accurately predict results of the multiple branch instructions, as compared to a branch prediction unit that does not include the prediction table 306a (a set associative branch prediction storage).

Figure 4:
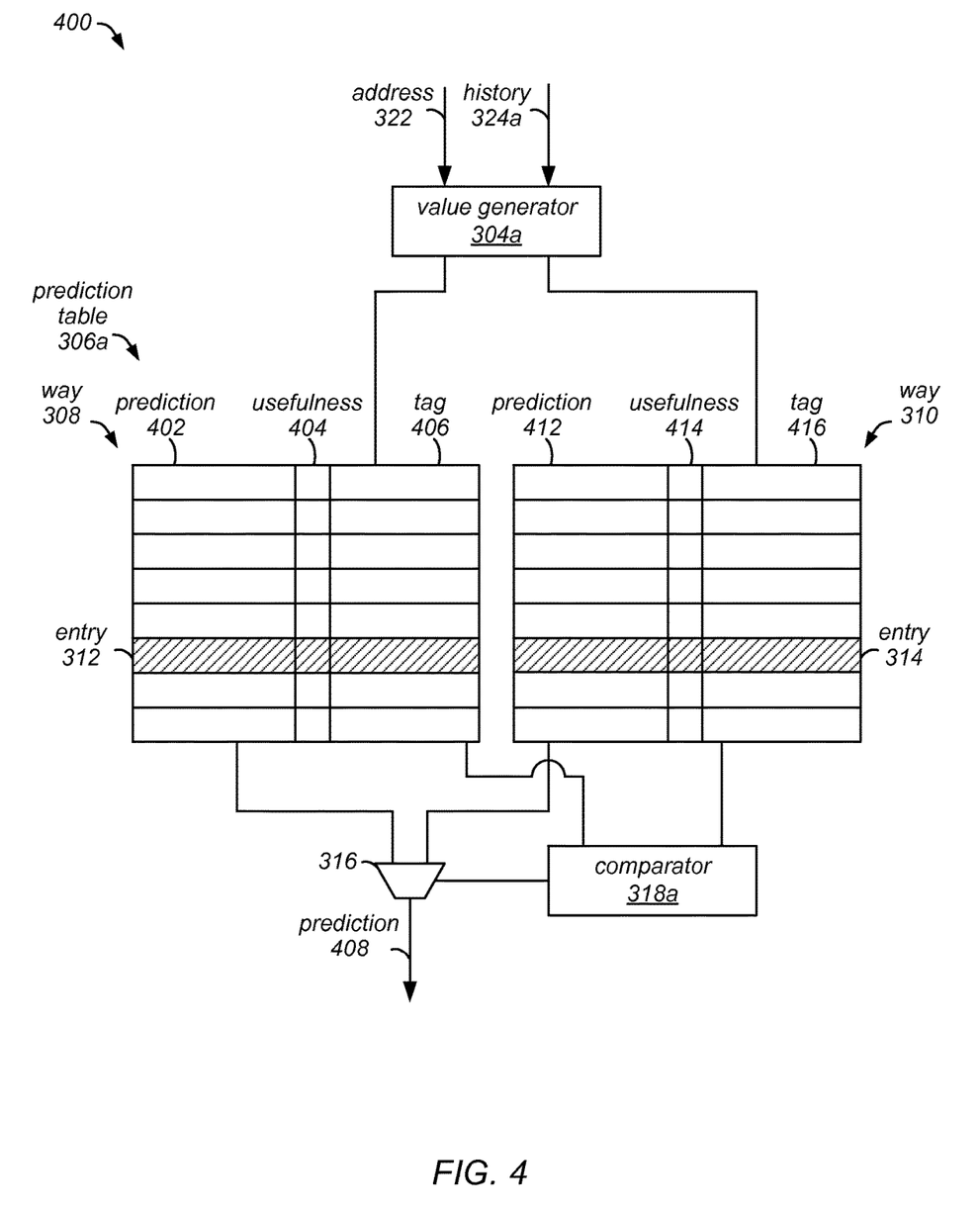
FIG. 4 is a block diagram illustrating one embodiment of an exemplary branch prediction circuit.

Turning now to FIG. 4, a block diagram of one embodiment of an exemplary branch prediction circuit 400 of the branch prediction unit 300 of FIG. 3 is shown. In the illustrated embodiment, the branch prediction circuit 400 includes the value generator 304a, the prediction table 306a, the selection device 316, and the comparator 318a of FIG. 3. In the illustrated embodiment, the prediction table 306a includes the ways 308 and 310 of FIG. 3. In the illustrated embodiment, the first way 308 includes a plurality of entries, including the first entry 312, where each entry includes a respective prediction 402, a respective usefulness indicator 404, and a respective tag 406. In the illustrated embodiment, the second way 310 includes a plurality of entries, including the second entry 314, where each entry includes a respective prediction 412, a respective usefulness indicator 414, and a respective tag 416.

As described above with reference to FIG. 3, the value generator may, based on the address information 322, the history information 324a, or both, generate an index value that identifies at least two entries of the prediction table 306a (one entry from the first way 308 and one entry from the second way 310). In the illustrated embodiment, the identified entries may be configured to provide the respective predictions 402 and 412 (e.g., to the selection device 316 and/or to one or more computation circuits (not shown)) and to provide the respective tags 406 and 416 to the comparator 318a. In some embodiments, one of the respective predictions 402 includes a branch prediction 408 generated as an output of the branch prediction circuit 400. In some embodiments, in response to at least one of the respective tags 406 and 416 matching a tag value corresponding to the branch instruction, the comparator 318a is configured to indicate to the selection device 316 that a corresponding prediction should be output as the branch prediction 408. For example, in response to the tag 406 of the first entry 312 matching the address information 322, the comparator 318a is configured to indicate to the selection device 316 that the prediction 402

(or a prediction generated based on the prediction 402) should be output as the branch prediction 408.

The respective usefulness indicators 404 and 414 may indicate whether prediction information stored in a respective entry has been used to predict a result of a branch instruction within a certain amount of time. For example, when a respective entry is used to correctly predict a result of a branch instruction, a value of the respective usefulness indicator may be incremented (e.g., from 00 to 01, where a value of 00 indicates "strongly useless" and a value of 11 indicates "strongly useful"). In some embodiments, the respective usefulness indicators 404 and 414 are periodically reset. In some embodiments, as further described below with reference to FIG. 7, the respective usefulness indicators 404 and 414 may be used (e.g., as a valid bit) to determine whether to store branch information in a respective entry of the prediction table. Alternatively, in some embodiments, the entries of the prediction table 306a may further include respective valid bits that indicate whether the respective entries of the prediction table 306a store valid data.

In some embodiments, the prediction table 306a may be configured to store information regarding multiple branch instructions which each map to a single index value at the value generator 304a. For example, the entries 312 and 314 may correspond to a single index value, and the prediction table 306a may store information regarding a first branch instruction that maps to the single index value at the first entry 312 and information regarding a second branch instruction that maps to the single index value at the second entry 314. The stored information may increase accuracy of branch prediction for the multiple branch instructions. Accordingly, storing the information regarding the multiple branch instructions may cause the branch prediction unit 300 to more accurately predict results of the multiple branch instructions, as compared to a branch prediction unit that does not include the prediction table 306a (a set associative branch prediction storage). Additionally, in some embodiments, if the entries of the prediction table 306a do not include respective valid bits, the prediction table 306a may be smaller, as compared to a prediction table including entries that include respective valid bits.

Figure 5:
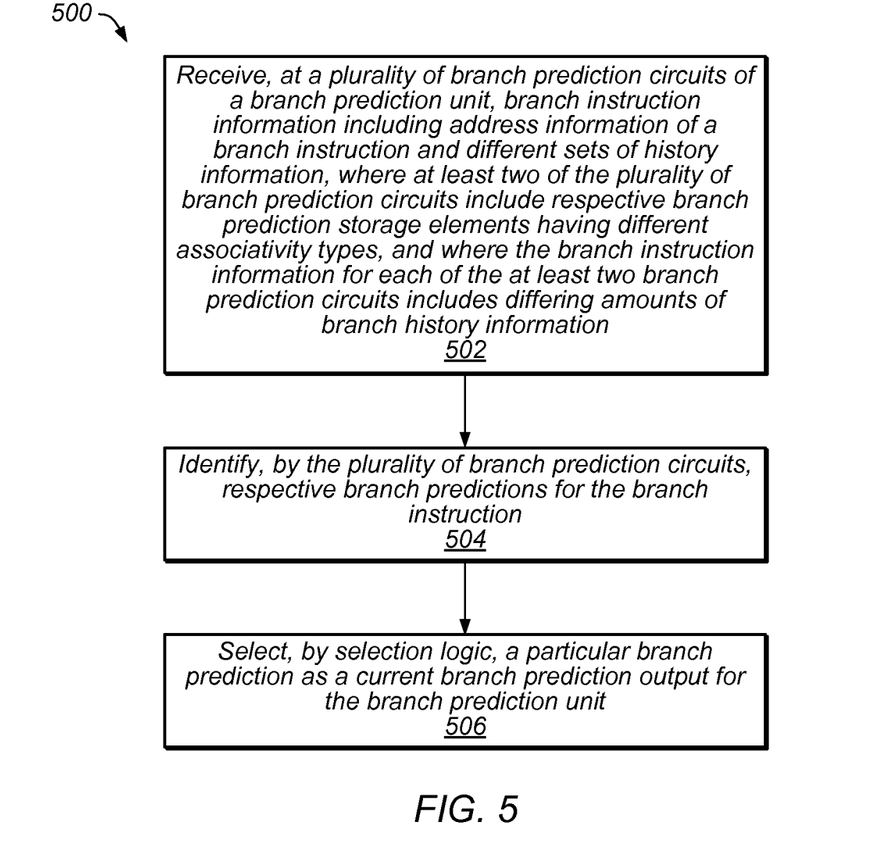
FIG. 5 is a flow diagram illustrating an embodiment of a method of operating a branch prediction unit.

Turning now to FIG. 5, a flow diagram of a method 500 is depicted. Method 500 is an embodiment of a method of operating a branch prediction unit, such as the branch prediction unit 102 of FIG. 1 or FIG. 2, the branch prediction unit 300 of FIG. 3, a branch prediction unit that includes the branch prediction circuit 400 of FIG. 4, or any combination thereof. In some embodiments, the method 500 may be initiated or performed by one or more processors in response to one or more instructions stored by a computer-readable storage medium.

At 502, the method 500 includes receiving, at a plurality of branch prediction circuits of a branch prediction unit, branch instruction information including address information of a branch instruction and different sets of history information. At least two of the branch prediction circuits may include respective branch prediction storage elements having different associativity types. The branch instruction information for each of the at least two branch prediction circuits may include differing amounts of branch history information. For example, the method 500 may include receiving, at the plurality of branch prediction circuits 104a-n of the branch prediction unit 102 of FIG. 2, branch instruction information including the address information 204 and the different respective sets of history information 202b-n. In the illustrated embodiment of FIG. 2, the branch prediction circuit 104b and the branch prediction circuit 104c each include respective branch prediction storage elements having different associativity types (e.g., the 4-way set associative branch prediction storage 206b and the 2-way set associative branch prediction storage 206c). In the illustrated embodiment of FIG. 2, the branch prediction circuit 104b receives a different amount of history information than the branch prediction circuit 104c (e.g., the history information 202b is smaller than the history information 202c).

At 504, the method 500 includes identifying, by the plurality of branch prediction circuits, respective branch predictions for the branch instruction. For example, the method 500 may include identifying, by the plurality of branch prediction circuits 104a-n of FIG. 2, respective branch predictions for the branch instruction.

At 506, the method 500 includes selecting, by selection logic, a particular branch prediction as a current branch prediction output for the branch prediction unit. For example, the method 500 may include selecting, by the selection logic 108 of FIG. 2, a particular branch prediction (e.g., the branch prediction from the branch prediction circuit 104c) as the branch prediction output 112 for the branch prediction unit 102.

In some embodiments, the method 500 further includes, in response to a branch prediction failure based on the particular branch prediction, providing branch prediction information from the first branch prediction circuit of the at least two branch prediction circuits to a second branch prediction circuit of the at least two branch prediction circuits. The branch prediction information may be provided from the first branch prediction circuit to the second branch prediction circuit in response to the particular branch prediction corresponding to the first branch prediction circuit. For example, the method 500 may include, in response to a branch prediction failure based on a branch prediction from the branch prediction circuit 104b, providing branch prediction information from the 4-way set associative branch prediction storage 206b to the 2-way set associative branch prediction storage 206c.

Figure 6:
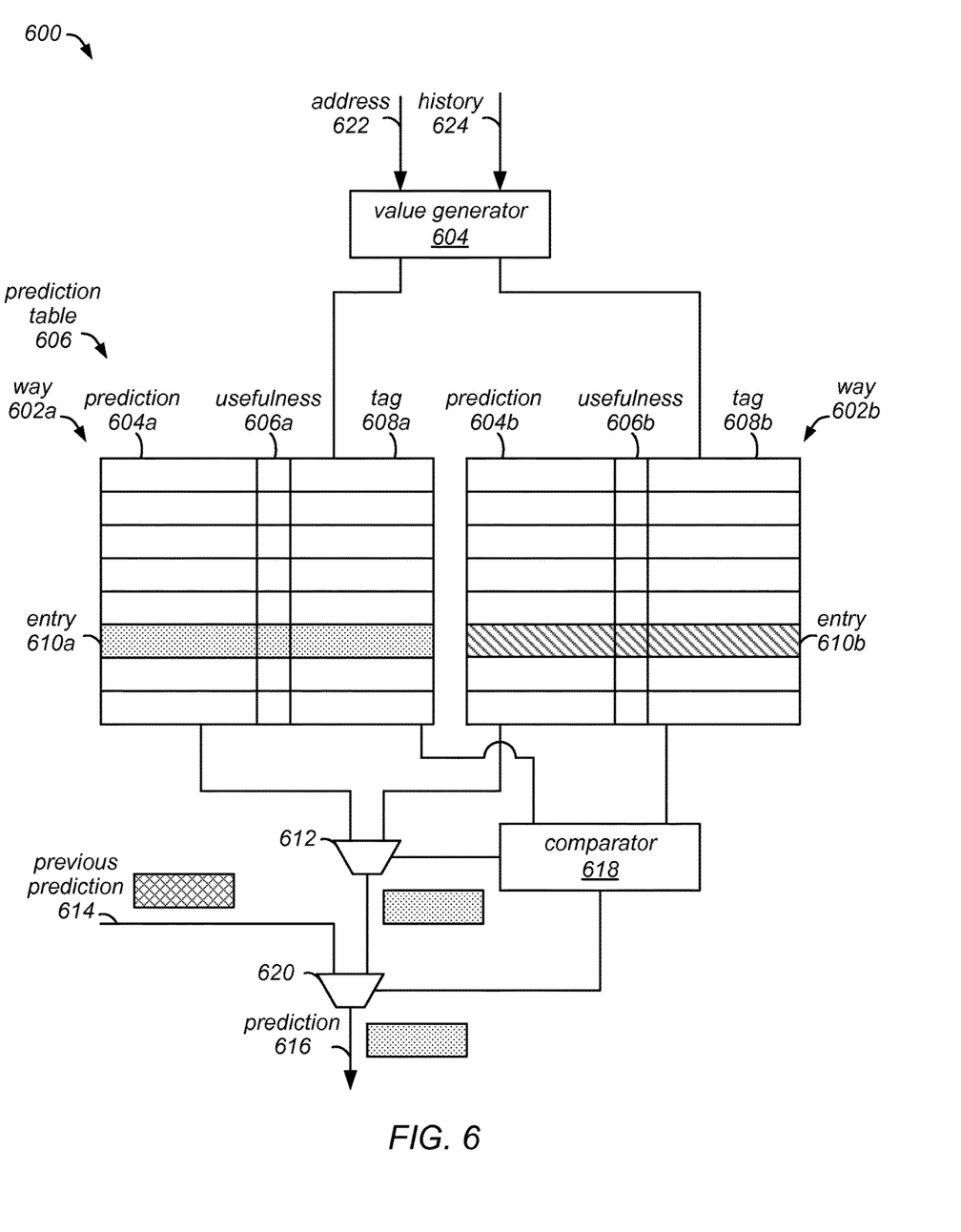
FIG. 6 is a block diagram illustrating an example branch prediction process performed by one embodiment of an exemplary branch prediction unit.

Turning next to FIG. 6, a block diagram of an example branch prediction process performed by one embodiment an exemplary branch prediction unit 600 is shown. In some embodiments, the branch prediction unit 600 corresponds to the branch prediction unit 300 of FIG. 3 and includes the branch prediction circuit 400 of FIG. 4. Portions of the branch prediction unit 600 may be omitted for clarity. In the illustrated embodiment, the portion of the exemplary branch prediction unit includes a value generator 604, a prediction table 606, a selection device 612, a comparator 618, and a selection circuit 620. In the illustrated embodiment, the prediction table 606 includes ways 602a-b. In the illustrated embodiment, the ways 602a-b include respective a pluralities of entries, including the respective entries 610a-b, where each respective entry includes a respective prediction 604a-b, a respective usefulness indicator 606a-b, and a respective tag 608a-b.

In some embodiments, the value generator 604 receives address information 622 and history information 624 regarding a branch instruction. In a particular embodiment, the value generator 604 generates an index value based on the address information 622, the history information 624, or both, and provides the index value to the prediction table 606.

In a particular embodiment, the prediction table 606 identifies the entries 610a and 610b based on the index value. The prediction table 606 may provide the prediction 604a of the entry 610a and the prediction 604b of the entry 610b to the selection device 612 as prediction outputs. The prediction table 606 may generate prediction outputs based on the history information 624, the prediction 604a of the entry 610a, and the prediction 604b of the entry 610b. Additionally, the prediction table 606 may provide the tag 608a of the entry 610a and the tag 608b of the entry 610b to the comparator.

The comparator 618 may compare the tag 608a of the entry 610a and the tag 608b of the entry 610b to the address information 622, the history information 624, a hash value, or any combination thereof (e.g., received via the value generator 604 or received from another device). For example, the comparator 618 may compare the tag 608a and the tag 608b to a hash value generated by the value generator 604. In the illustrated embodiment, the comparator 618 identifies that the entry 610a corresponds to the branch instruction. Accordingly, the comparator 618 indicates to the selection device 612 that the input from the way 602a should be provided as an output. Additionally, in response to determining that the tag 608a of the entry 610a matches the hash value, the comparator 618 may indicate to the selection circuit 620 that the prediction table 606 includes an entry (610a) that corresponds to the branch instruction. In the illustrated embodiment, in response to receiving the indication that the prediction table 606 includes the entry that corresponds to the branch instruction, the selection circuit provides the output of the selection device 612 as a current prediction output 616.

In response to an indication that the prediction table 606 does not include an entry that corresponds to the branch instruction (e.g., because the tag 608a of the entry 610a and the tag 608b of the entry 610b do not match the hash value), the selection device 612 may be configured to provide a previous prediction 614 (e.g., from another branch prediction circuit or from a base predictor) as the current prediction output 616. In some embodiments, the previous prediction 614 may be received from a branch prediction circuit that receives a smaller history than the history information 624.

Figure 7:
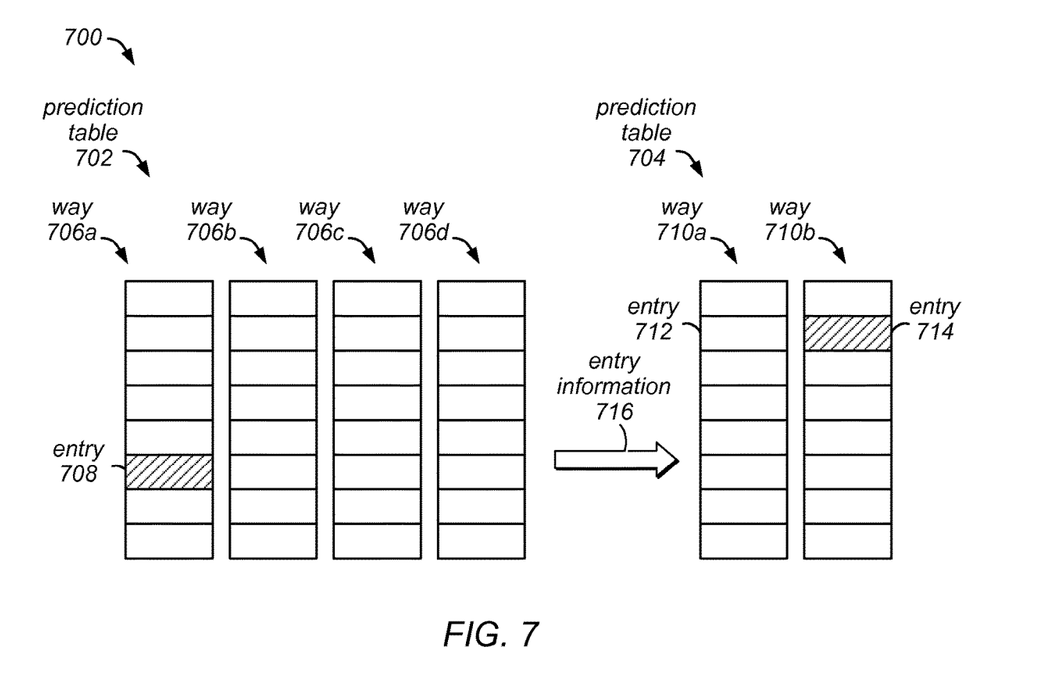
FIG. 7 is a block diagram illustrating an example branch prediction storage process performed by one embodiment of an exemplary branch prediction unit.

Turning next to FIG. 7, a block diagram of an example branch prediction storage process performed by one embodiment of an exemplary branch prediction unit 700 is shown. Portions of the branch prediction unit 700 may be omitted for clarity. In the illustrated embodiment, the branch prediction unit 700 includes a first branch prediction table 702 and a second branch prediction table 704. In the illustrated embodiment, the first branch prediction table 702 includes ways 706a-d and the ways 706a-d include respective pluralities of entries, including an entry 708 of way 706a. In the illustrated embodiment, the second branch prediction table 704 includes ways 710a-b and the ways 710a-b include respective pluralities of entries, including an entry 712 of way 710a and an entry 714 of way 710b. In some embodiments, the branch prediction unit 700 corresponds to the branch prediction unit 102 of FIG. 2. For example, the first branch prediction table 702 may correspond to the 4-way set associative branch prediction storage 206b and the second branch prediction table 704 may correspond to the 2-way set associative branch prediction storage 206c of FIG. 2.

As described above, the first branch prediction table 702 may be configured to provide branch predictions. For example, the first branch prediction table 702 may provide information stored at the entry 708 as part of a branch prediction process. In response to an indication of a branch mispredict, the first branch prediction table 702 may be configured to provide entry information 716 stored at the entry 708 to a prediction table configured to receive a larger set of history information (e.g., a prediction table more likely to produce a correct branch prediction). For example, the first branch prediction table 702 may provide the entry information 716 to the second branch prediction table 704.

In some embodiments, based on index information of the entry information 716, the second branch prediction table 704 may be configured to determine a set of entries (e.g., the entries 712 and 714) as potential storage targets for the entry information 716. At least one of the entries 712 and 714 may be occupied by other (previously stored) entry information. If the entries 712 and 714 include respective valid bits, a replacement policy (e.g., a Least Recently Used replacement policy) may be used to select an entry to store the entry information 716. Accordingly, the second branch prediction table 704 may store the entry information 716 and may generate predictions based on the entry information (e.g., and additional history information) during future predictions regarding the branch instruction.

In other embodiments, if the entries 712 and 714 do not include respective valid bits, respective usefulness indicators may be used to select an entry to store the entry information 716. For example, if the entry 712 includes entry information including a usefulness indicator larger than a particular threshold (e.g., a value bigger than 01), the branch prediction unit 700 may attempt to save the entry information 716 in the entry 714. However, in some embodiments, a usefulness indicator may indicate an entry is useful only after the entry is used as part of a branch prediction. Accordingly, the branch prediction unit 700 may be unable to determine whether an entry stores entry information that has not yet been used or whether the entry does not store valid entry information. In some embodiments, this problem may result in the branch prediction unit 700 storing the entry information 716 over valid entry information (e.g., in the entry 712) when the entry 714 does not store valid entry information. One way to mitigate this potential problem is to randomly or pseudorandomly identify an initial selection (e.g., a starting point) between identified entries (e.g., based on a total number of branch mispredicts of the branch prediction unit 700 modulus the number of ways of the second branch prediction table 704). Accordingly, in the illustrated embodiment, after an initial selection is pseudorandomly identified, a first entry having a usefulness value below the particular threshold (e.g., a first "useless" entry) may be selected to store the entry information 716 (e.g., an "updated selection"). In some embodiments, if all identified entries of the second prediction table 704 have a usefulness value greater than a threshold value (e.g., all identified entries are "useful"), the entry information 716 may not be saved at the second prediction table 704. For example, the entry information 716 may remain at the prediction table 702. Alternatively, the entry information 716 may be sent to another prediction table (e.g., a prediction table that receives a larger set of history information than the second prediction table 704).

A branch prediction unit including a branch prediction storage (e.g., the second branch prediction table 704) in which entries are selected to store entry information based on usefulness bits may be smaller than a corresponding branch prediction storage in which entries are selected to store entry information based on valid bits. Additionally, in some embodiments, the second branch prediction table 704 may have fewer cache misses, as compared to a prediction table in which a first "useless" entry is always selected to store the entry information 716 (e.g., due to an entry being constantly overwritten before corresponding branch instructions are executed enough times to increment the respective usefulness indicator above the particular threshold).

Figure 8:
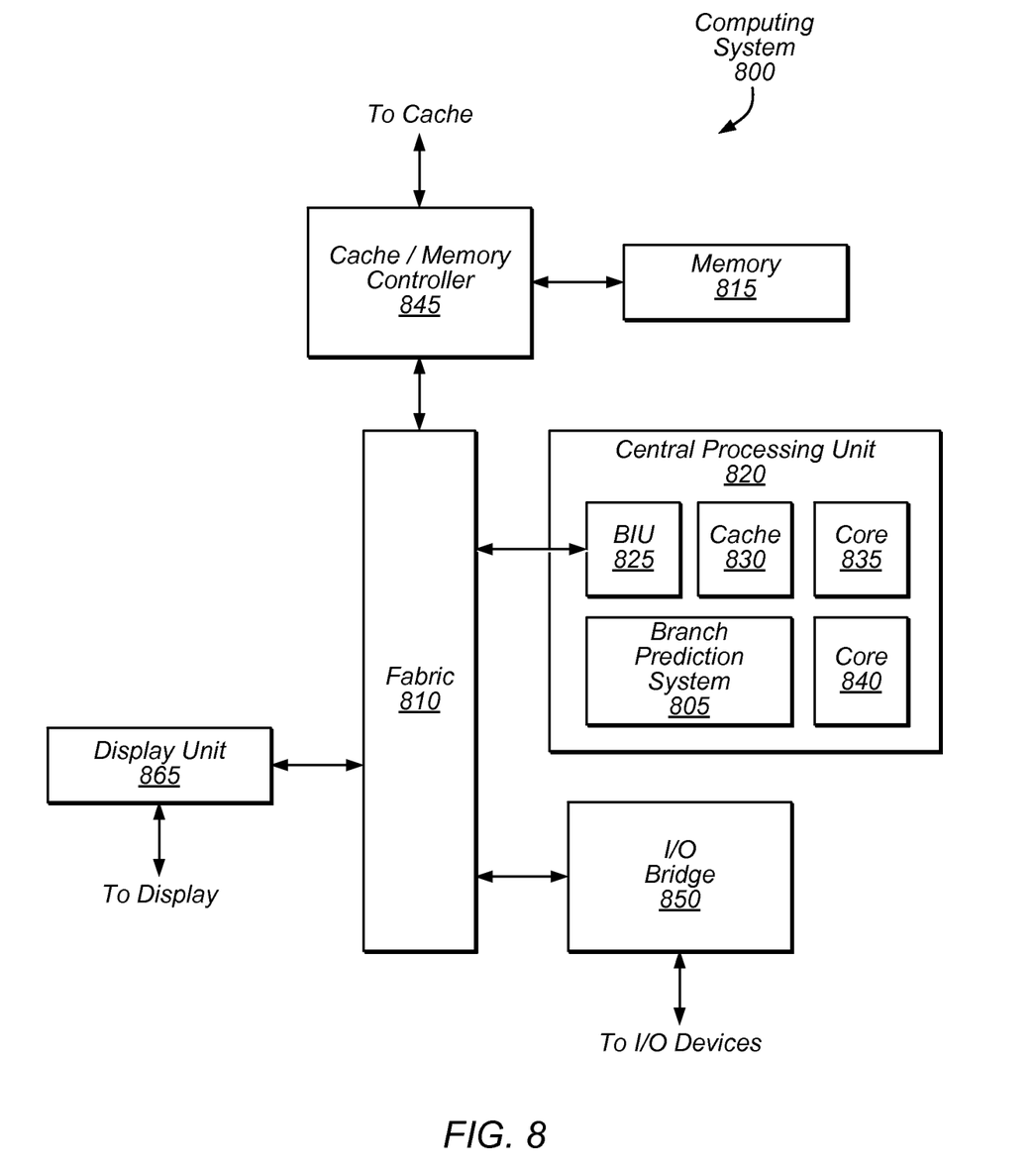
FIG. 8 is a block diagram illustrating an embodiment of an exemplary computing system that includes a branch prediction system.

Turning next to FIG. 8, a block diagram illustrating an exemplary embodiment of a computing system 800 is shown. The computing system 800 is an embodiment of a computing system that includes a branch prediction system 805. In some embodiments, the branch prediction system 805 corresponds to the branch prediction system 100 described above with reference to FIG. 1. In some embodiments, the branch prediction system 805 includes one or more of the branch prediction units described above with reference to FIGS. 1-7, including any variations or modifications described previously with reference to FIGS. 1-7. In some embodiments, some or all elements of the computing system 800 may be included within a system on a chip (SoC). In some embodiments, computing system 800 is included in a mobile device. Accordingly, in at least some embodiments, area and power consumption of the computing system 800 may be important design considerations. In the illustrated embodiment, the computing system 800 includes fabric 810, central processing unit (CPU) complex 820, input/output (I/O) bridge 850, cache/memory controller 845, branch prediction system 805, and display unit 865. Although the computing system 800 illustrates the branch prediction system 805 as being located in the CPU complex 820, in other embodiments, the branch prediction system 805 may be connected to or included in other components of the computing system 800. Additionally or alternatively, the computing system 800 may include multiple branch prediction systems 805. The multiple branch prediction systems 805 may correspond to different embodiments or to the same embodiment.

Fabric 810 may include various interconnects, buses, MUXes, controllers, etc., and may be configured to facilitate communication between various elements of computing system 800. In some embodiments, portions of fabric 810 are configured to implement various different communication protocols. In other embodiments, fabric 810 implements a single communication protocol and elements coupled to fabric 810 may convert from the single communication protocol to other communication protocols internally.

In the illustrated embodiment, CPU complex 820 includes bus interface unit (BIU) 825, cache 830, cores 835 and 840, and branch prediction system 805. In various embodiments, CPU complex 820 includes various numbers of cores and/or caches. For example, CPU complex 820 may include 1, 2, or 4 processor cores, or any other suitable number. In an embodiment, cache 830 is a set associative L2 cache. In some embodiments, cores 835 and/or 840 include internal instruction and/or data caches. In some embodiments, a coherency unit (not shown) in fabric 810, cache 830, or elsewhere in computing system 800 is configured to maintain coherency between various caches of computing system 800. BIU 825 may be configured to manage communication between CPU complex 820 and other elements of computing system 800. Processor cores such as cores 835 and 840 may be configured to execute instructions of a particular instruction set architecture (ISA), which may include operating system instructions and user application instructions. In some embodiments, the branch prediction system 805 is configured to predict results of branch instructions for one or more processor cores (e.g., one or more of the cores 835 and 840).

Cache/memory controller 845 may be configured to manage transfer of data between fabric 810 and one or more caches and/or memories (e.g., non-transitory computer readable mediums). For example, cache/memory controller 845 may be coupled to an L3 cache, which may, in turn, be coupled to a system memory. In other embodiments, cache/ memory controller 845 is directly coupled to a memory. In some embodiments, the cache/memory controller 845 includes one or more internal caches. In some embodiments, the cache/memory controller 845 may include or be coupled to one or more caches and/or memories that include instructions that, when executed by one or more processors (e.g., the CPU complex 820 and/or one or more cores 835, 840 of the CPU complex 820), cause the processor, processors, or cores to initiate or perform some or all of the processes described above with reference to FIG. 5. In some embodiments, one or more caches and/or memories coupled to the cache/memory controller 845 store at least a portion of the branch instruction information 110 of FIG. 1.

As used herein, the term "coupled to" may indicate one or more connections between elements, and a coupling may include intervening elements. For example, in FIG. 8, display unit 865 may be described as "coupled to" the CPU complex 820 through fabric 810. In contrast, in the illustrated embodiment of FIG. 8, display unit 865 is "directly coupled" to fabric 810 because there are no intervening elements.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 800 via I/O bridge 850. In some embodiments, the branch prediction system 805 may be coupled to the computing system 800 via the I/O bridge 850.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a branch prediction unit that includes:

a plurality of branch prediction circuits configured to receive an address of a branch instruction and differing amounts of history information, wherein the plurality of branch prediction circuits are configured such that a first one of the plurality of branch prediction circuits that receives less history information than a second one of the plurality of branch prediction circuits includes a first storage element having a higher associativity than a second storage element of the second branch prediction circuit, and wherein those ones of the plurality of branch prediction circuits that have an entry corresponding to the branch instruction are configured to output respective branch predictions for the branch instruction; and selection logic configured to select, as an output of the branch prediction unit for the branch instruction, the respective branch prediction provided by that branch prediction circuit having the greatest amount of history information relative to any other branch prediction circuits providing a branch prediction for the branch instruction.

2. The apparatus of claim 1, wherein the first branch prediction circuit is configured to generate, based on the address and a respective amount of history information, an index value that identifies at least two entries of the first storage element, and wherein at least one of the at least two entries includes prediction information usable to generate the respective branch prediction for the first branch prediction circuit.

3. The apparatus of claim 1, wherein the first storage element of the first branch prediction circuit is larger than the second storage element of the second branch prediction circuit.

4. The apparatus of claim 3, wherein the branch prediction unit is configured to provide, based on respective sizes of the first storage element of the first branch prediction circuit and the second storage element of the second branch prediction circuit, more history information to the second branch prediction circuit than to the first branch prediction circuit.

5. The apparatus of claim 1, wherein the first branch prediction circuit is configured to:
identify at least two entries of the first storage element based on address information of a particular branch instruction and a respective amount of history information; and
store prediction information of the particular branch instruction in a first entry of the at least two entries.

6. The apparatus of claim 5, wherein the first branch prediction circuit is configured to select the first entry by:
pseudorandomly identifying a second entry as an initial selection;
determining that a value of a usefulness indicator of the second entry is greater than a threshold value;
identifying the first entry as an updated selection; and
determining that a value of a usefulness indicator of the first entry is less than the threshold value.

7. The apparatus of claim 5, wherein the first branch prediction circuit is further configured to increase a value of a usefulness indicator stored in the first entry in response to the prediction information from the first entry correctly predicting a result of the particular branch instruction.

8. The apparatus of claim 5, wherein the at least two entries each include respective valid bits, and wherein the first branch prediction circuit is configured to select the first entry from the at least two entries using a least recently used selection process based on the respective valid bits.

9. The apparatus of claim 1, wherein entries of the first storage element do not include valid bits, and wherein the first branch prediction circuit is configured to determine whether entries of the first storage element are valid using respective usefulness indicators.

10. The apparatus of claim 1, wherein the branch prediction unit further includes:
a base prediction unit that is configured to generate, without history information, a branch prediction for the branch instruction.

11. A method comprising:
receiving, at a plurality of branch prediction circuits of a branch prediction unit, branch instruction information comprising address information of a branch instruction and different amounts of history information, wherein the plurality of branch prediction circuits are configured such that a first branch prediction circuit of the plurality of branch prediction circuits that receives less history information than a second branch prediction circuit of the plurality of branch prediction circuits includes a first storage element having a higher associativity type than a second storage element of the second branch prediction circuit;
identifying, by ones of the plurality of branch prediction circuits having an entry corresponding to the branch instruction, respective branch predictions for the branch instruction; and
selecting, by selection logic, a particular branch prediction as a current branch prediction output for the branch prediction unit, wherein the particular branch prediction is selected from that branch prediction circuit having the greatest amount of history information relative to any other branch prediction circuits providing a branch prediction for the branch instruction.

12. The method of claim 11, wherein the first storage element of the first branch prediction circuit is a two-way set associative branch prediction storage element and the second storage element of the second branch prediction circuit is a direct mapped branch prediction storage element.

13. The method of claim 11, wherein the first storage element of the first branch prediction circuit is an eight-way set associative branch prediction storage element and the second storage element of the second branch prediction circuit is a two-way set associative branch prediction storage element.

14. The method of claim 13, further comprising, in response to a branch prediction failure based on the particular branch prediction, providing branch prediction information from the first storage element of the first branch prediction circuit to the second storage element of the second branch prediction circuit, wherein the particular branch prediction corresponds to the first branch prediction circuit.

15. An apparatus, comprising:
a plurality of branch prediction circuits configured to receive an address of a branch instruction and differing amounts of history information, wherein the plurality of branch prediction circuits are configured such that a first one of the plurality of branch prediction circuits that receives less history information than a second one of the plurality of branch prediction circuits includes a first branch prediction memory circuit having a higher associativity than a second branch prediction memory circuit of the second branch prediction circuit, wherein the first branch prediction circuit comprises:
the first branch prediction memory circuit that includes a plurality of entries configured to store branch prediction information, wherein the first branch prediction memory circuit is configured to identify, based on the address of the branch instruction, at least one of the plurality of entries; and a comparator circuit configured to provide a respective branch prediction based on branch prediction information stored at one of the at least one identified entry; and selection logic configured to select, as an output for the branch instruction, a branch prediction provided by that branch prediction circuit having the greatest amount of history information relative to any other branch prediction circuits providing a branch prediction for the branch instruction.

16. The apparatus of claim 15, wherein the first branch prediction memory circuit and the second branch prediction memory circuit are configured to identify the respective at least one of the plurality of entries and to generate the respective branch predictions based on the differing amounts of history information.

17. The apparatus of claim 16, further comprising history routing logic configured to provide a greater amount of the history information to the second branch prediction memory circuit, as compared to the first branch prediction memory circuit, wherein the second branch prediction memory circuit is direct mapped.

18. The apparatus of claim 16, wherein the plurality of branch prediction circuits comprise a base prediction unit that includes a tagless memory circuit and that is configured to generate a corresponding branch prediction that matches the branch instruction.

* * * * *